United States Patent
Katz et al.

Patent Number: 5,525,416
Date of Patent: Jun. 11, 1996

[54] PLAY AREA SURFACE TREATMENT

[75] Inventors: Norman Katz; Judith Katz, both of Buffalo Grove, Ill.

[73] Assignee: Uppy, Inc., Mt. Prospect, Ill.

[21] Appl. No.: 423,039

[22] Filed: Apr. 17, 1995

[51] Int. Cl.⁶ ........................................... B32B 9/00
[52] U.S. Cl. ........................... 428/283; 428/95; 428/143; 428/147; 428/150; 428/172; 428/240; 428/246; 428/284; 428/290; 428/308.4; 428/323; 428/327; 405/36; 404/31; 404/32; 156/278; 156/279
[58] Field of Search ........................... 428/283, 284, 428/290, 327, 147, 143, 323, 172, 308.4, 349, 150, 95, 240, 323; 405/36; 404/31, 32; 156/278, 279

[56] References Cited

U.S. PATENT DOCUMENTS

| | | | |
|---|---|---|---|
| 3,022,712 | 2/1962 | Cousino et al. | 94/7 |
| 3,446,122 | 5/1969 | Raichle et al. | 94/1 |
| 3,461,844 | 8/1969 | Harrison | 119/28 |
| 3,577,893 | 5/1971 | Towner | 94/4 |
| 3,801,421 | 4/1974 | Allen et al. | 161/67 |
| 4,564,310 | 1/1986 | Ihelen et al. | 404/31 |
| 4,800,119 | 1/1989 | Kolar | 428/283 |
| 5,026,207 | 6/1991 | Heath | 405/46 |
| 5,182,137 | 1/1993 | Allen | 427/138 |
| 5,183,438 | 2/1993 | Blom | 472/92 |
| 5,360,048 | 11/1994 | Lauer | 156/86 |

*Primary Examiner*—Patrick J. Ryan
*Assistant Examiner*—Abraham Bahta
*Attorney, Agent, or Firm*—Michael, Best & Friedrich

[57] ABSTRACT

A play area surface treatment is provided comprising, from top to bottom: a layer of polymeric mesh, a layer of landscape separator, six inches of ground rubber buffing, a second layer of landscape separator, and six inches of pea gravel as a base material. Additionally, a protective edging is provided which is attached to the top layer of nylon woven mesh and provides a protective edging surrounding the play area.

19 Claims, 2 Drawing Sheets

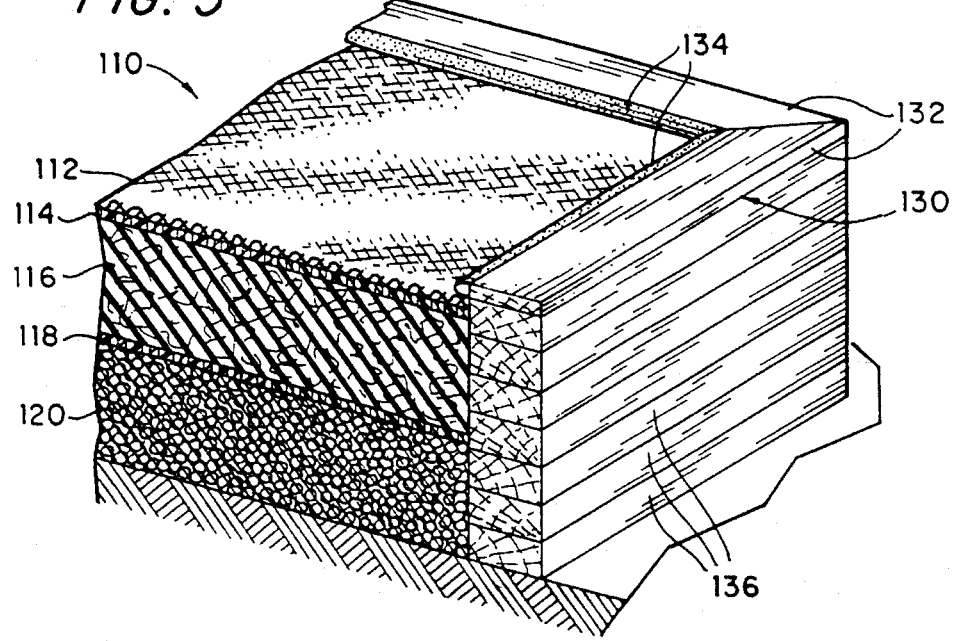
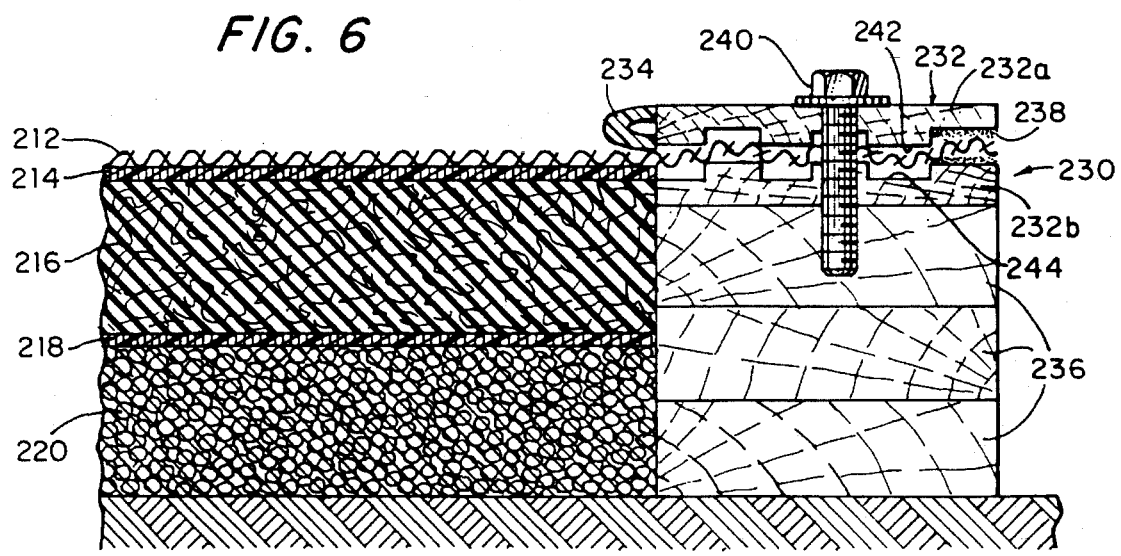

PLAY AREA SURFACE TREATMENT

BACKGROUND OF THE INVENTION

The present invention relates to the field of outdoor surface treatments. More particularly, the invention relates to outdoor surface treatments used as ground cover below play equipment or athletic fields.

Numerous surface treatments for athletic fields, playgrounds, and other play areas are known in the art. Many prior art surface treatments have addressed the need to provide a surface treatment which is durable, adequately provides drainage, and also provides a degree of safety to participants who may come in violent contact with the surface treatment.

U.S. Pat. No. 3,801,421 discloses a resilient composite useful as surfacing for athletic fields. The surface material is essentially a vulcanized rubber treated with isocyanate. However, an entire outdoor surfacing treatment is not disclosed, just a surfacing material made of particulate vulcanized rubber which is bonded with an isocyanate resin.

U.S. Pat. No. 5,182,137 discloses a method of applying a bound particulate rubber outdoor surface. This invention addresses the method of laying down a track surface similar to those used in track and field events. However, it does not address the concern that differing the types of materials used for the surface will change the types of activities for which surfacing treatments should be used.

U.S. Pat. No. 3,022,712 discloses a shock absorbing structure. The shock absorbing structure consists of a layered cushion, not a flooring or an outdoor surface treatment. As such, the structure disclosed therein does not address the needs of an outdoor surface treatment.

U.S. Pat. No. 4,564,310 discloses a resilient paving composition for playfields, sportsfields, and recreation areas. This composition is composed from top to bottom as follows: a topping layer followed by a combination of latex and vulcanized scrap rubber; followed by a layer of fibrous vulcanized scrap rubber without latex; and, a mineral aggregate as a base material. However, the topping layer is composed of about 70% vulcanized rubber particles, zinc oxide in about 1–7% of weight, and 25% rubber latex. The use of vulcanized rubber particles, although providing a certain thermal stability, may in fact be too hard for some uses.

U.S. Pat. No. 3,446,122 discloses an elastic surface for sports grounds, playgrounds, and footpaths. The surface disclosed consists of from top to bottom: a water permeable top layer, a fibrous bottom layer, and an elastic middle layer composed of plastic spheres. Although this surface provides the requisite drainage for an outdoor surface treatment, it does not address the need for adequate protection from injuries occurring when participants make violent contact with the surface.

SUMMARY OF THE INVENTION

Accordingly, a play area surface treatment is provided to address the problems of the prior art. Briefly, the play area surface treatment from top to bottom consists of: a layer of knitted polymer mesh, a layer of landscape fabric, six inches of ground rubber (buffing), a second layer of landscape fabric, and six inches of pea gravel as a base material. Additionally, a protective edging may be provided which is attached to the top layer of the knitted polymer mesh and provides a protective edging surrounding the play area. The play area surface treatment may also include a confinement wall extending below the protective edging which provides lateral support to the layers of the surface treatment.

In a preferred embodiment, the knitted polymer mesh is common shade cloth available in bulk from local supply stores. The mesh provides superior drainage qualities and provides excellent traction to participants using the play area surface treatment. Additionally, the mesh has a resilient structure which prevents overlap problems. The layer of rubber is composed of loose particulate ground rubber providing resiliency and drainage not heretofore seen in the prior art. This rubber layer is of the type capable of conforming to specifications found for surface treatments in the American with Disabilities Act, herein incorporated by reference. The resilient particulate compacts to result in a stable surface in addition maintaining a high degree of resiliency. The protective edging may be made from common 1"×6" wood pieces or pieces of recycled plastic laid flat around the perimeter of the play area and may have a PVC bulb or other resilient material attached to the inner face of the protective edging in order to provide a transition from the play area to the surrounding surfaces. This protective edging provides approximately ¼" of drop from the edging to the top of the surface treatment in conformity with the Americans with Disabilities Act. The base material is composed of pea gravel and provides the proper drainage and support necessary for a functional outdoor play area surface treatment. The confinement wall may be made utilizing conventional railroad ties and provides lateral support to the entire play area surface treatment.

Additionally, the use of inexpensive drainage and resiliency materials in combination with an encapsulating overlay of mesh and fabric, provides a novel solution to problems found in the prior art. Such problems as tracking of the resilient material or the surface treatment being washed away by rain thereby reducing the resiliency of the surface treatment or requiring maintainence are minimized or eliminated while utilizing easily obtainable and inexpensive materials.

Other features and advantages of the invention will become apparent to those of ordinary skill in the art upon review of the following detailed description, claims, and drawings.

BRIEF DESCRIPTION OF THE DRAWINGS

FIG. 5 is a front perspective view with cross section of the protective edging.

FIG. 6 is a cross sectional view of a protective edging, a confinement wall, and a layer of mesh, first layer of landscape fabric, resilient particulate, a second layer of landscape fabric, and base material.

Figure 1:
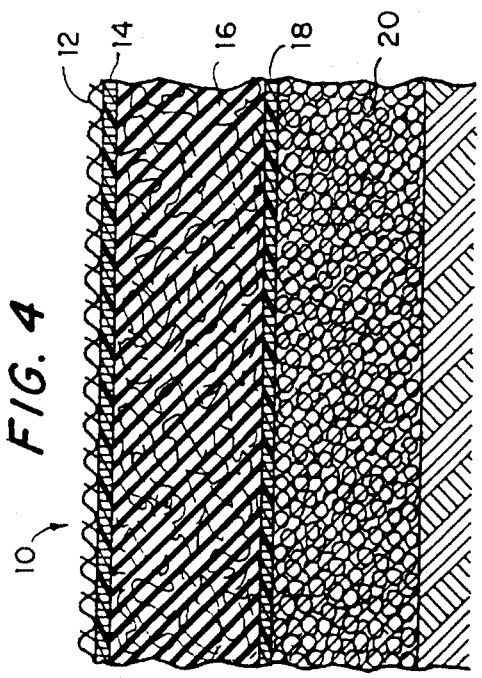
FIG. 1 is a front perspective view with cross section of the play area surface treatment.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF THE PREFERRED EMBODIMENTS

FIG. 1 is a front perspective view with cross section of the play area surface treatment 10. FIG. 1 shows the play area surface treatment 10 consisting of mesh 12, landscape fabric 14, resilient particulate 16, a second layer of landscape fabric 18 and base material 20. FIG. 1 shows the play area surface treatment 10 in its entirety and shows how the elements which comprise the play area surface treatment 10 are arranged. Mesh 12 is shown as the topmost overlay of the play area surface treatment 10. Landscape fabric 14 provides the next layer beneath mesh 12. Beneath landscape fabric 14 is a layer of resilient particulate 16. A second layer of landscape fabric 18 is below resilient particulate 16 covering a base 20. The play area surface treatment 10 may also be constructed to have a protective edging provided around the perimeter of the area in which the play area surface treatment is laid. The play area surface treatment 10 functions as an inexpensive surface treatment and may be used to cover areas ranging in size from a smaller jungle-gym type area to areas larger than traditional football fields or playgrounds.

The mesh 12 is preferably knitted or woven polyethylene monofilament such as that available from the Solartex Company of Winter Park, Fla. One of their fabric products made from the knitted polyethylene plastic is called WEATHASHADE®. WEATHASHADE® uses a 100% round MONOLON® monofilament which provides a number of advantages and makes it ideal for use as the top layer of the play area surface treatment. The WEATHASHADE® brand mesh provides a high level of tear resistance, durability, and absence of fraying. Further, the use of a knitted or woven mesh allows for adequate drainage within the play area surface treatment and which is a necessity for outdoor surface treatments in general. Further, the use of a polymeric mesh means that degradation due to the environment will be minimal over a long period of time and the fabric itself will not interfere with the activities of the participants on the play area such as problems with traction or severe friction burns. In a preferred embodiment using the WEATHASHADE® brand mesh, the mesh has approximately a four millimeter row separation and a zig-zag monofilament arrangement between the rows such that the effect of pore size is approximately 1 mm$^2$. Further, in the embodiment utilizing the WEATHASHADE® brand mesh, the mesh is knitted with a special locking stitch such that there is no fraying of the mesh if it is cut. Although in other preferred embodiments, a woven fabric is also contemplated. In a preferred embodiment, the stitch count, in stitches per inch, should be in the range of 7 to 17 stitches per inch. Concerning the strength of the mesh 12, in the preferred embodiment, the mesh 12 should be able to withstand between 35 and 70 force pounds on a 5"×2½" sample with a percentage of deflection to fall within the range of 25% to 60%. The mesh is available in a variety of sizes depending on the area to be covered by the play area surface treatment and is available in rolls for efficient application of the mesh to a work site. In actual use, the mesh needs no centrally located securement mechanism due to the resilient nature of the mesh and the ability to spring back into place after a temporary displacement occurs.

The first layer of landscape fabric 14 lies immediately below mesh 12. The landscape fabric is of the type commonly found at any landscaping or nursery supply store. The landscape fabric in a preferred embodiment is composed of a porous material. The landscape fabric is also available in a variety of thicknesses and sizes. The thickness of landscape fabric ranges from approximately 1.0 mil plastic, similar to plastic bags, to approximately 5.0 mm thick, similar to that of roofing felt. In a preferred embodiment, the landscape fabric is approximately 2 to 3 millimeters thick. The landscape fabric is available in rolls ranging in width from six feet wide to forty-five feet wide. Depending on the size of the surface treatment to be constructed, the sheets of porous landscape fabric 14 may become joined with an appropriate adhesive or fastening material. In a preferred embodiment, the fastening material is conventional duct tape.

The resilient particulate 16 is composed in a preferred embodiment of loose particulate ground rubber buffing which provides the resiliency and drainage necessary for an outdoor play surface. In one preferred embodiment of the invention, finely ground automotive tires may be used as the source for rubber buffing, however no metal or fiber containing portions are used. In one preferred embodiment, GRANULITE® brand ground rubber which is produced from truck and passenger retread buffings may be used as the resilient particulate 16. The GRANULITE® brand rubber buffing may be obtained from the Baker Rubber Company of South Bend, Ind., 46680-2438, (219)237-6293. In a sieve analysis, which measures the percentage of retained weight, the sieve numbers from ¼ to 30 are contemplated as within the scope of the invention. This correlates with GRANULITE brand ground rubber, BF series. In other embodiments, sieve numbers up to 50 may be used. It is also contemplated that due to the composite nature of automobile tires, that a preferred embodiment may contain first generation ground particulate resilient materials. The particularity of the buffing in a preferred embodiment varies from strips which are ¹⁄₃₂" to ¹⁄₁₆" thick and 1½"×⅛" sized strips, to strips up to 3"×3" in size. The particularity depends on the exact nature of the buffing process. However the particulate cannot be so large as to significantly reduce the resiliency of the play area surface treatment or to reduce compaction. In yet another embodiment of the invention, the resilient particulate 16 may consist of soft, nonabsorbant scrap made from the backing or jute of used carpeting. Notwithstanding, it is the layer of resilient particulate 16 which provides the injury preventing function of the play area surface treatment 10. As such, in a preferred embodiment, the resilient particulate 16 is approximately six inches deep, although it is contemplated that the thickness of the resilient particulate 16 may vary. The resilient particulate 16 is held in place by being sandwiched between the first landscape fabric 14 and the second landscape fabric 18.

Further, it is contemplated that there be an edging at the perimeter of the play area surface treatment 10 in order to confine the resilient particulate 16 which is made from common edging material such as lumber, plastic or a similar composite. Because it is intended to provide a play area surface treatment 10 which reduces the amount of injury to the participants using the surface, the play area surface treatment 10 complies with the safety and access requirements as delineated under the Americans With Disabilities Act. As such, the standards as delineated in 28 C.F.R. Part 36, Nondiscrimination on the Basis of Disability by Public Accomodations and in Commercial Facilities, are incorporated by reference herein. Accordingly, in a preferred embodiment of this invention, the impact deceleration data in ASTM tests yields G values in accordance with other surfaces which also use particulate rubber buffing as the resilient material.

The second landscape fabric 18 is substantially the same as that used in the first landscape fabric 14 and consists of the same porous material available at many hardware, nursery and landscaping retailers. Again, it is the porous nature of the landscape fabric which provides the drainage necessary for an outdoor surface treatment. However, the second landscape fabric 18 functions to support the resilient particulate 16 and to confine the base material 20. In a preferred embodiment, the second landscape fabric is approximately two millimeters to three millimeters thick.

The base material 20 functions to allow drainage of moisture away from the upper layers, and also functions as a transitional layer to the ground upon which the play area surface treatment 10 is located. In a preferred embodiment, the base material is composed of pea gravel. However, the base material may be made of any appropriate sized particulate which functions to draw moisture away from the upper layers. In a preferred embodiment, the base material is approximately six inches thick. However, it is contemplated that thicknesses ranging from three to twelve inches would provide the drainage necessary for an outdoor surface treatment. Additionally, gravel ranging in size from ⅛" up to 1" may be used to allow water to drain into the surrounding top soil.

Figure 3:
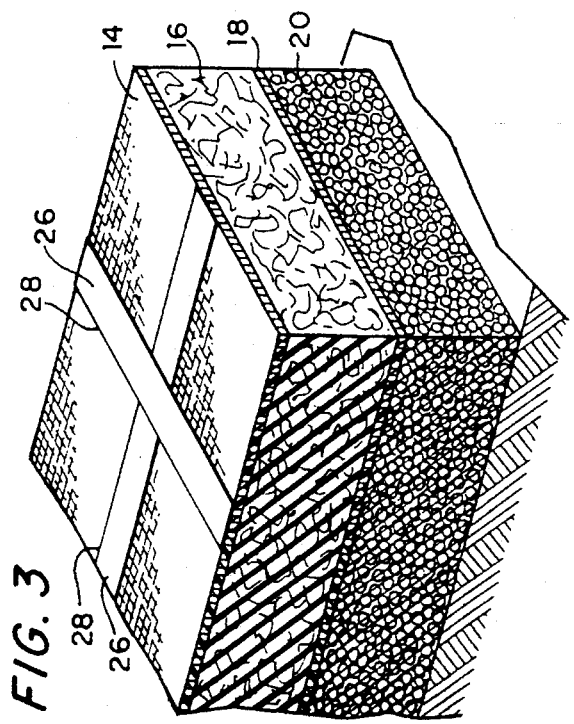
FIG. 3 is a front perspective view with cross section of a base material, a layer of landscape fabric, a resilient layer, and a second layer of landscape fabric.
Figure 2:
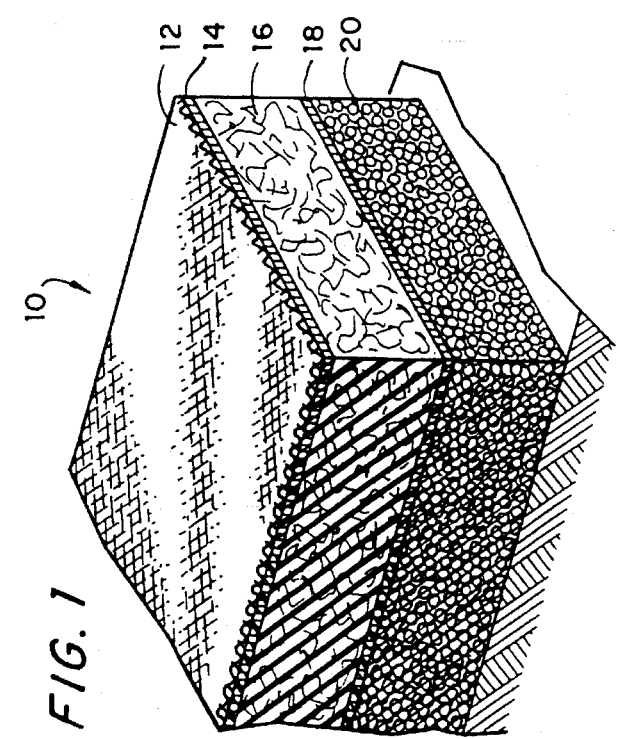
FIG. 2 is a front perspective view with cross section of the base material covered with a layer of landscape fabric.

FIG. 2 is a front perspective view with cross section of the base material 20 covered with a first layer of landscape fabric 18. FIG. 2 shows sections of the second layer of landscape fabric 18 conjoined at seams 22 by adhesive 24. FIG. 2 shows how porous landscape fabric 18 will allow moisture to be drawn into the base material 20 until absorption by the top soil. In one embodiment of the play area surface treatment 10, the adhesive 24 is common duct tape due to the ease of its availability and its cost saving features. In other embodiments, the landscape fabric 18 may be conjoined by sewing with fishing line. FIG. 3 is a front perspective View with cross section of base material 20, a second layer of landscape fabric 18, a layer of resilient particulate 16, and a first layer of landscape fabric 14. FIG. 3 also shows that seats of landscape fabric 14 may be conjoined by adhesive 28 at seams 26. Similar to the preferred embodiment described in FIG. 2, the adhesive 28 is common duct tape. FIG. 3 also shows how the two layers of landscape fabric 14 and 18 sandwich the resilient particulate 16 and confine the base material 20.

Figure 4:
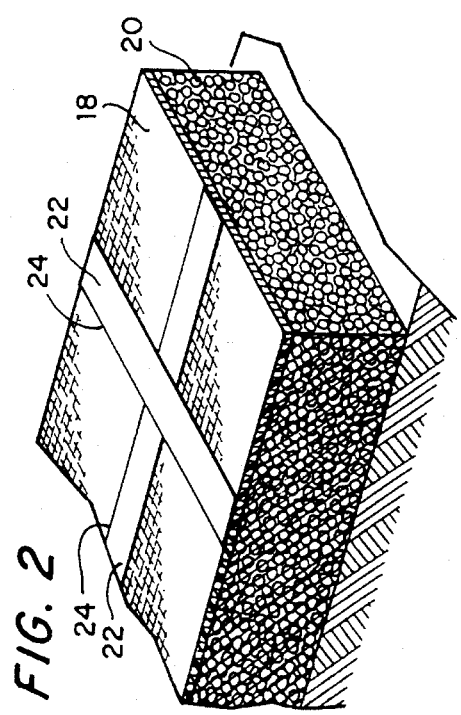
FIG. 4 is a cross sectional view of the play area surface treatment.

FIG. 4 is a cross-sectional view of the play area surface treatment 10. FIG. 4 shows how mesh 12 lays over landscape fabric 14. FIG. 4 also shows how the two layers of landscape fabric 14 and 18 sandwich in the layer of resilient particulate 16. FIG. 4 shows how the loose ground resilient particulate 16 provides interstices for the drainage of moisture through the play area surface treatment 10. FIG. 4 also shows the interstices in the base material 20, allowing the retained moisture to be deposited into the ground on which the play area surface treatment 10 is located.

FIG. 5 is a front perspective view with cross-section of an embodiment of the play area surface treatment 110 having a protective edging 130. FIG. 5 shows the play area surface treatment 110 having the base material 120 confined by the second layer of landscape fabric 118. FIG. 5 also shows how resilient particulate 116 is sandwiched between the layers of landscape fabric 114 and 118 and how mesh 112 provides a durable top layer. Protective edging 130 is shown anchoring and confining the play area surface treatment 110 providing an injury preventing transition to the surrounding grounds. In embodiments which use resilient cap 134, the resilient cap 134 provides a transition function allowing a "step down" process to occur where participants are moving from adjacent areas onto the play area surface treatment 110. This is particularly important as an accessibility feature for those entering the area covered by the surface treatment in wheelchairs and those addressed in the Americans with Disabilities Act (ADA), incorporated herein by reference. Protective edging 130 is composed of resilient cap 134 and edging base 132. FIG. 5 shows how resilient cap 134 rests atop edging base 132 and confers the injury-preventing function due to the resiliency of its materials. In a preferred embodiment, resilient cap 134 is a common polymeric bulb made from rubber, polyvinyl chloride, or similar resilient materials and their composites. In a preferred embodiment, edging base 132 is made from 1"×6" piece of lumber but in other embodiments may also be constructed from lengths of appropriately sized pieces made from plastics, natural fibers, or composite materials. FIG. 5 also shows confinement wall 136 extending downward from edging base 132 such that it holds the particulate materials of the play area surface treatment 110 in place. In this embodiment, the confinement wall 136 provides lateral support to the layers of the play area surface treatment 110 in situations where lateral support is necessary or desirable. The confinement wall 136 also provides a base from which to attach the mesh 112, and the layers of landscape fabric 114 and 118 such that the materials are fixedly positioned, i.e. will not substantially move from where they are laid in place. In a preferred embodiment, the mesh 112 and landscape fabrics 114 and 118 may be attached to the confinement wall 136 using conventional securement devices such as tacks, brads, staples, and nails, or may also use adhesives, structural securement mechanisms or combinations of the above. In a preferred embodiment, confinement wall 36 is made of railroad ties but may be made of other sizes of lumber such as landscape timbers, metal, or plastic sheeting.

FIG. 6 is a cross sectional view of protective edging 230, confinement wall 236, and layer of mesh 212, first layer of landscape fabric 214, resilient particulate 216, a second layer of landscape fabric 218, and base material 220. FIG. 6 shows how, in one preferred embodiment, mesh 212 is fixedly positioned between a top half 232a of edging base 232 and bottom half 232b of edging base 232. Although mesh 212 may be fixedly positioned between top half 232a and bottom half 232b of edging base 232 in various ways, FIG. 6 shows top half 232a and bottom half 232b of edging base 232 having a tongue 242 and groove 244 feature wherein top half 232a and bottom half 232b are joined by interlocking ridges. These interlocking ridges provide a secure means of attaching mesh 212 to protective edging 230 such that the mesh 212 will not be subject to tearing forces inherent in mechanical attachment means i.e. tacks. In this embodiment of the protective edging 230, resilient adhesive 238 is employed to create a substantially uniform attachment surface between the mesh 212 and the edging base 232 and also as a waterproofing measure against environmental degradation. In a preferred embodiment, resilient adhesive 238 is silicon or rubber caulking, although other similar compounds are contemplated as within the scope of the invention. FIG. 6 also shows screw 240 attaching protective edging 230 to confinement wall 236. In a preferred embodiment, edging base 232 is made of two 1"×6" pieces of lumber and confinement wall 236 is made of railroad ties. In other embodiments, confinement wall 236 may be made from landscaping timbers or other similar materials. In this embodiment, the top half 232a and bottom half 232b of edging base 232 have material removed to define interlocking ridges having a depth of ½ inch and resulting in an edging base 232 having a total height of approximately three inches. Accordingly, screw 240 has a length of approximately four inches in this embodiment to connect edging base 232 to confinement wall 236. Other embodiments utilizing similar attachment means are contemplated as within the scope of the invention.

While a preferred embodiment of the invention has been described, by way of example, various modifications will become apparent to one of ordinary skill in the art. Thus, the scope of the invention is to be limited only by the spirit and scope of the following claims.

I claim:

1. A play area surface treatment comprising:
   a layer of porous mesh fabric;
   means for fixedly positioning the mesh to the play area;
   a first layer of porous plastic landscape fabric beneath the mesh;
   a layer of ground pieces of resilient material beneath the first layer of landscape fabric;
   a second layer of porous plastic landscape fabric beneath the layer of ground pieces of resilient material; and
   a layer of coarse gravel-like drainage material.

2. The invention of claim 1 wherein the layer of mesh is made from an intertwined polymeric material.

3. The invention of claim 1 wherein the means for fixedly positioning the mesh further includes a confinement wall and fastening means for attaching the mesh to said confinement wall.

4. The invention of claim 1 wherein the first layer of landscape fabric ranges in thickness from 0.001 mm to 5.0 mm.

5. The invention of claim 1 wherein the resilient particulate material is ground rubber buffing.

6. The invention of claim 1 wherein the coarse drainage material is pea gravel.

7. The invention of claim 2 wherein the intertwined polymeric material is polyethylene monofilament.

8. The invention of claim 1 wherein the resilient particulate material is used carpet backing.

9. The invention of claim 4 wherein the ground rubber buffing is a shredded tire product having substantially all metal and fibers removed, the shredded tire product having a sieve number substantially between ¼ and 50.

10. The invention of claim 1 wherein the pea gravel ranges is size from ⅛" to 1" diameter particulate.

11. The invention of claim 1 wherein the layer of ground pieces of resilient material has a depth of at least three to as much as twelve inches.

12. The invention of claim 1 wherein the layer of coarse gravel-like drainage material has a depth of at least three to twelve inches.

13. The invention of claim 1 further having a resilient protective edging for providing an injury preventing transition to the surrounding grounds.

14. The invention of claim 13 wherein the protective edging consists a resilient cap attached to an edging base, the resilient cap attached to a lateral face of the edging base and providing a drop of approximately ¼ inch from a top of the edging base to a top surface of the mesh, the edging base made from material taken from the following group wherein the group comprises: natural fiber materials, polymeric materials, or composite materials.

15. The invention of claim i wherein the mesh has a locking stitch configuration and a plurality of pores, the pores having a pore size of approximately one square millimeter, the mesh further having a stitch count ranging from 7 to 17 stitches per inch.

16. The invention of claim 3 wherein the fastening means for attaching the mesh to the confinement wall further includes a top piece of the protective edging and a bottom piece of the protective edging, the top piece and the bottom piece engaging the mesh by interlocking of the top piece with the bottom piece whereby the mesh is disposed therebetween, and a fastener attaching the protective edging to the confinement wall.

17. The invention of claim 1 wherein the first layer of porous plastic landscape fabric comprises a plurality of strips of porous plastic landscape fabric, the strips having outer marginal portions, and means for securing said outer marginal portions of the strips to provide a substantially planar configuration to the first layer of landscape fabric, and the second layer of porous plastic landscape fabric comprises a plurality of strips of porous plastic landscape fabric, the strips having outer marginal portions, and means for securing said outer marginal portions of the strips to provide a substantially planar configuration to the second layer of landscape fabric.

18. The invention of claim 1 further including a confinement wall constructed of materials taken from the following group, the group comprising: railroad ties; landscaping timbers; metal sheeting; or plastic sheeting.

19. A play area surface treatment comprising:
   a layer of mesh, the mesh constructed from polymeric material, and having a plurality of monofilaments defining a plurality of pores, the plurality of monofilaments having a locking stitch configuration;
   means for fixedly positioning the mesh, the means for fixedly positioning the mesh including a confinement wall and an attachment mechanism for attaching the mesh to the confinement wall;
   a first layer of landscape fabric beneath the mesh, the first layer of landscape fabric being substantially porous and approximately 1 to 3 millimeters in thickness;
   a layer of particulate resilient material beneath the first layer of landscape fabric, the layer having a depth of at least 3 inches and the particulate resilient material constructed from ground rubber buffing;
   a second layer of landscape fabric beneath the layer of particulate resilient material, the second layer of landscape fabric being substantially porous and approximately 1 to 3 millimeters in thickness;
   a layer of coarse drainage material, the coarse drainage material having a particulate size ranging from ⅛" to 1" and being substantially composed of pea gravel; and,
   a protective edging, the protective edging consisting of a resilient cap attached to an edging base.

\* \* \* \* \*

UNITED STATES PATENT AND TRADEMARK OFFICE
CERTIFICATE OF CORRECTION

PATENT NO. : 5,525,416
DATED : June 11, 1996
INVENTOR(S) : Norman Katz, Judith Katz It is certified that error appears in the above-indentified patent and that said Letters Patent is hereby corrected as shown below:

Column 8, line 7, "claim i" should be  --claim 1 --.

Signed and Sealed this

Twentieth Day of August, 1996

Attest:

BRUCE LEHMAN

Attesting Officer    Commissioner of Patents and Trademarks